United States Patent
Wilson et al.

(10) Patent No.: US 9,800,195 B2
(45) Date of Patent: *Oct. 24, 2017

(54) PREDICTING MOTOR FAILURE BASED ON RELATIONSHIP OF MOTOR PAIR CHARACTERISTICS

(71) Applicant: Joy MM Delaware, Inc., Wilmington, DE (US)

(72) Inventors: James Wilson, Franklin, PA (US); Nicolaas Petrus van Wyk, Johannesburg (ZA)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,247

(22) Filed: Jun. 22, 2016

(65) Prior Publication Data

US 2016/0308485 A1    Oct. 20, 2016

Related U.S. Application Data

(63) Continuation of application No. 13/785,550, filed on Mar. 5, 2013, now Pat. No. 9,391,495.

(51) Int. Cl.
*G01R 31/00* (2006.01)
*H02P 29/00* (2016.01)
(Continued)

(52) U.S. Cl.
CPC .......... *H02P 29/0055* (2013.01); *H02K 11/25* (2016.01); *H02P 5/00* (2013.01); *H02P 29/64* (2016.02); *H02K 2213/06* (2013.01)

(58) Field of Classification Search
CPC .. H02K 2213/06; B60L 2260/50; Y02T 10/84
See application file for complete search history.

(56) References Cited

U.S. PATENT DOCUMENTS 4,097,091 A    6/1978 Knorr
6,700,266 B2 *  3/2004 Winkel .................... F04D 25/08
                                                    310/112

(Continued)

FOREIGN PATENT DOCUMENTS

GB        2196445 A    4/1988

OTHER PUBLICATIONS

Search Report from the United Kingdom Intellectual Property Office for Application No. GB1403109.0 dated Sep. 16, 2014 (3 pages).

*Primary Examiner* — Elias Desta
(74) *Attorney, Agent, or Firm* — Michael Best & Friedrich LLP

(57) ABSTRACT

A system and method of predicting motor failure based on relationships of motor pair characteristics, such as temperatures. One method includes receiving, by a controller, a parameter of a first motor on a mining machine from a first parameter sensor on a mining machine. The method also includes receiving, by the controller, a parameter of a second motor on the mining machine from a second parameter sensor on the mining machine. The method also includes outputting an alarm signal, by the controller, upon (1) determining that at least one of the parameters of the first motor and the second motor exceeds a parameter threshold and (2) determining that the parameter of the first motor differed from the parameter of the second motor by at least a difference threshold for a predetermined amount of time.

22 Claims, 8 Drawing Sheets

(51) Int. Cl.
*H02K 11/25* (2016.01)
*H02P 5/00* (2016.01)
*H02P 29/64* (2016.01)

(56) References Cited

U.S. PATENT DOCUMENTS

| | | |
|---|---|---|
| 6,810,341 B2 | 10/2004 | Qian et al. |
| 9,391,495 B2 * | 7/2016 | Wilson .................. H02K 11/25 |
| 2005/0246593 A1 | 11/2005 | Littrell |
| 2008/0262663 A1 | 10/2008 | Ausloos et al. |
| 2011/0227723 A1 | 9/2011 | Dewey et al. |
| 2012/0092180 A1 | 4/2012 | Rikkola et al. |
| 2013/0013138 A1 | 1/2013 | Lu et al. |

* cited by examiner

PREDICTING MOTOR FAILURE BASED ON RELATIONSHIP OF MOTOR PAIR CHARACTERISTICS

RELATED APPLICATIONS

This application is a continuation application of U.S. application Ser. No. 13/785,550 filed on Mar. 5, 2013, now U.S. Pat. No. 9,391,495, the entire content of which is herein incorporated by reference.

BACKGROUND

The present invention relates to monitoring mining machine components.

SUMMARY

Mining machines, such as continuous miners, often include motor pairs for driving similar components. For example, a continuous miner includes a motor pair for driving cutting heads, a motor pair for gathering heads, and a motor pair for tracks that move the machine. Motor failures on mining machines can be costly and require a number of man-hours to repair and replace parts. The mining machine is generally inoperable while being repaired, and the lack of revenue-producing mining activity further compounds the cost of motor failures.

As each motor in the motor pair performs similar work functions, a variance in their relative temperatures may indicate a problem, a need for maintenance, and/or predict a future malfunction. Accordingly, embodiments of the invention include detecting particular variances in the relative temperatures of a motor pair, and generating an alarm such that a costly failure of one of the motors can be avoided.

In one embodiment, the invention provides a method of predicting motor failure. The method includes receiving, by a controller, a parameter of a first motor on a mining machine from a first parameter sensor on a mining machine. The method also includes receiving, by the controller, a parameter of a second motor on the mining machine from a second parameter sensor on the mining machine. The method also includes outputting an alarm signal, by the controller, upon (1) determining that at least one of the parameters of the first motor and the second motor exceeds a parameter threshold and (2) determining that the parameter of the first motor differed from the parameter of the second motor by at least a difference threshold for a predetermined amount of time.

In another embodiment the invention provides a mining machine monitoring system. The system includes a motor pair of a machine including a first motor and a second motor. The system also includes a first parameter sensor that detects a parameter of the first motor and a second parameter sensor that detects a second parameter of the second motor. The system also includes a controller coupled to the first and second parameter sensors to obtain the first and second parameters. The controller outputs an alarm signal upon (1) determining that at least one of the first and second parameters exceeds a parameter threshold and (2) determining that the first parameter of the first motor differed from the second parameter of the second motor by at least a difference threshold for a predetermined amount of time.

In another embodiment the invention provides a method of predicting motor failure. The method includes receiving, by a controller, a parameter of a first motor on a mining machine from a first parameter sensor on a mining machine. The method also includes receiving, by the controller, a second parameter of a second motor on the mining machine from a second parameter sensor on the mining machine. The second motor is downstream from the first motor in a series cooling system. The method also includes outputting a first alarm signal, by the controller, upon determining that the parameter of the first motor is greater than the second parameter of the second motor by at least a first difference threshold. The method also includes outputting a second alarm signal, by the controller, upon determining that the second parameter of the second motor is greater than the parameter of the first motor by at least a second difference threshold. The second difference threshold is greater than the first different threshold.

In another embodiment the invention provides a mining machine monitoring system. The system having a motor pair of a machine including a first motor and a second motor. The second motor is downstream from the first motor in a series cooling system. The system also includes a first parameter sensor that detects a parameter of the first motor and a second parameter sensor that detects a second parameter of the second motor. The system also includes a controller coupled to the first and second parameter sensors to obtain the first and second parameters. The controller is configured to receive a parameter of the first motor on a mining machine from the first parameter sensor on a mining machine. The controller is also configured to receive a second parameter of the second motor on the mining machine from the second parameter sensor on the mining machine. The controller is also configured to output a first alarm signal upon determining that the parameter of the first motor is greater than the second parameter of the second motor by at least a first difference threshold. The controller is also configured to output a second alarm signal upon determining that the second parameter of the second motor is greater than the parameter of the first motor by at least a second difference threshold. The second difference threshold is greater than the first different threshold.

Other aspects of the invention will become apparent by consideration of the detailed description and accompanying drawings.

DETAILED DESCRIPTION

Figure 1:
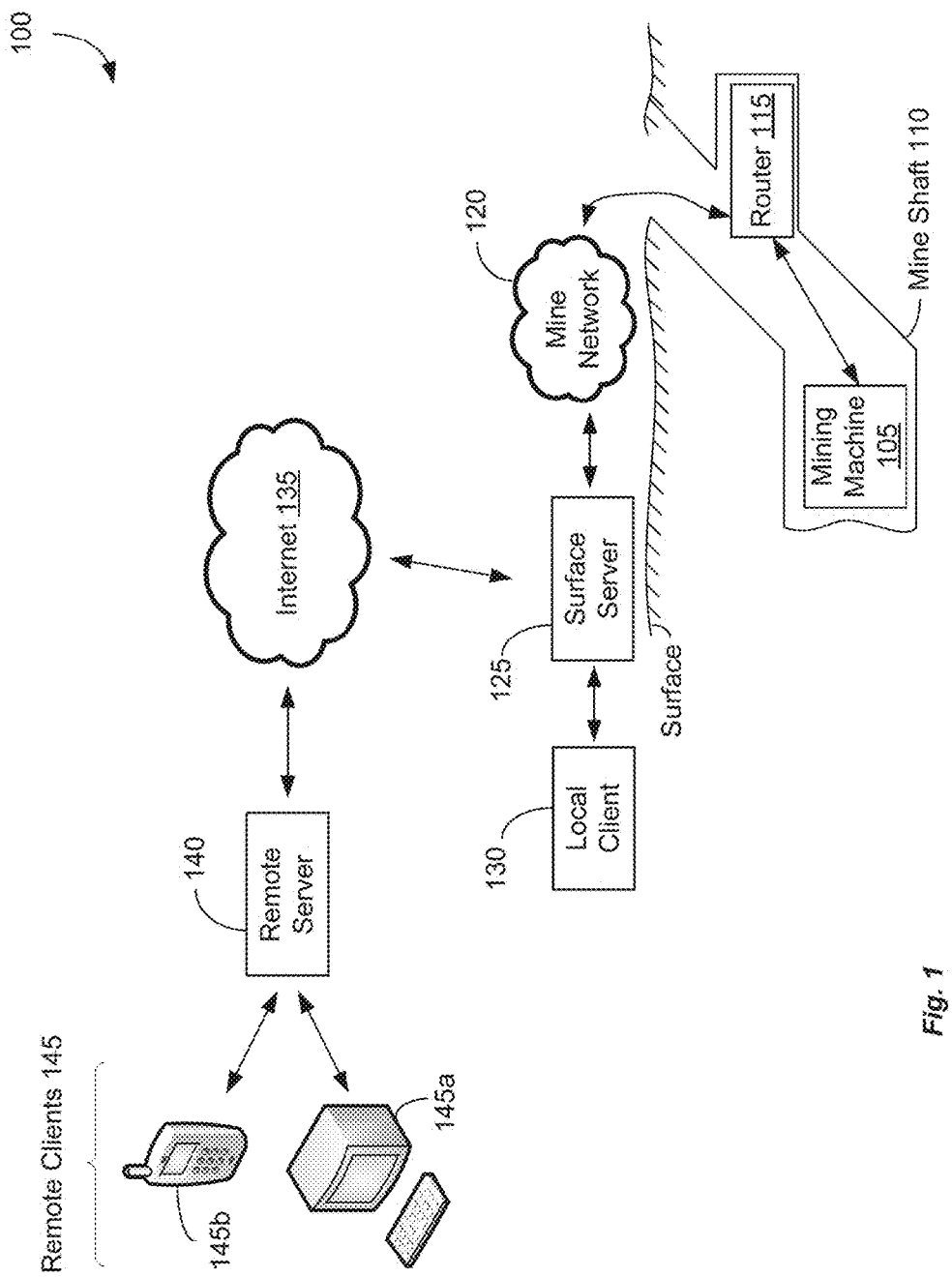
FIG. 1 illustrates a remote mining machine monitoring system for of predicting motor failure based on a relationship of motor pair characteristics.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should also be noted that a plurality of hardware and software based devices, as well as a plurality of different structural components may be used to implement the invention.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" and "modules" described in the specification can include standard processing components, such as one or more processors, one or more computer readable medium modules, one or more input/output interfaces, and various connections (e.g., a system bus) connecting the components. In some instances, the controllers and modules may be implemented as one or more of general purpose processors, digital signal processors (DSPs), application specific integrated circuits (ASICs), and field programmable gate arrays (FPGAs) that execute instructions or otherwise implement their functions described herein.

FIG. 1 illustrates a remote mining machine monitoring system 100 including a mining machine 105 in an underground mine shaft 110. The mining machine 105 is in communication with a router 115, which is also positioned in the mine shaft 110. The router 115 communicates via a local mine network 120 with a surface server 125. The surface server 125 is further in communication with one or more local clients 130, which may include personal computers, laptops, tablets, smart phones, etc., and is in communication with the Internet 135. A remote server 140 is in communication with the Internet 135 and remote clients 145, such as personal computers 145a, laptops (not shown), tablets (not shown), smart phones 145b, etc.

Each of the components in the system 100 are communicatively coupled for bidirectional communications. The communication paths between any two components of the system 100 may be wired (e.g., via Ethernet cables or otherwise), wireless (e.g., via a WiFi®, cellular, Bluetooth® protocols), or a combination thereof. Although only a single mining machine 105 and router 115 are depicted in FIG. 1, additional mining machines 105 may be coupled to the router 115. Similarly, additional routers 115 may be included to provide alternate communication paths to the mine network 120 and to communicate with other mining machines. Thus, the mine network 120 provides communication paths between the surface server 125 and various mining machine 105 and routers 115. Furthermore, additional remote clients 145, remote servers 140, local clients 130, surface servers 125 may also be included in the system 100.

Figure 2A:
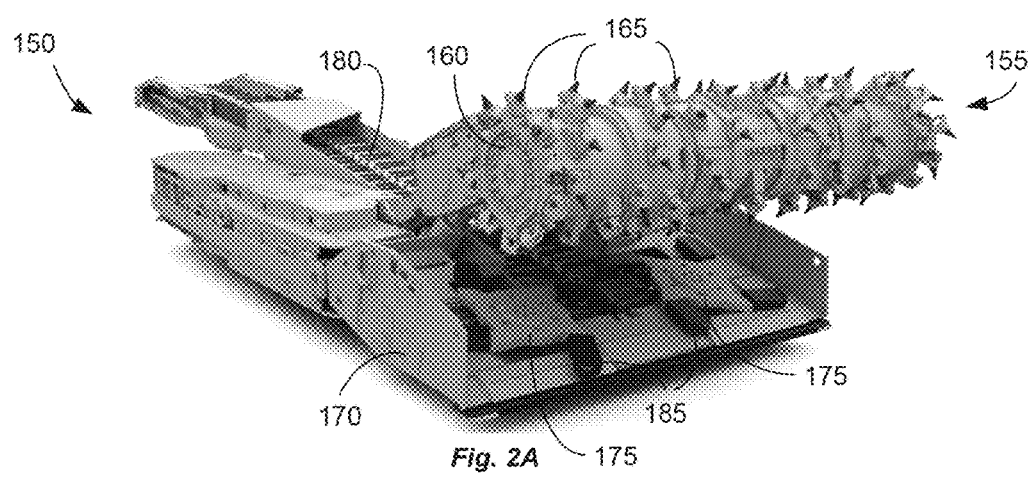
FIGS. 2A-C illustrate a mining machine with motor pair monitoring.
Figure 2B:
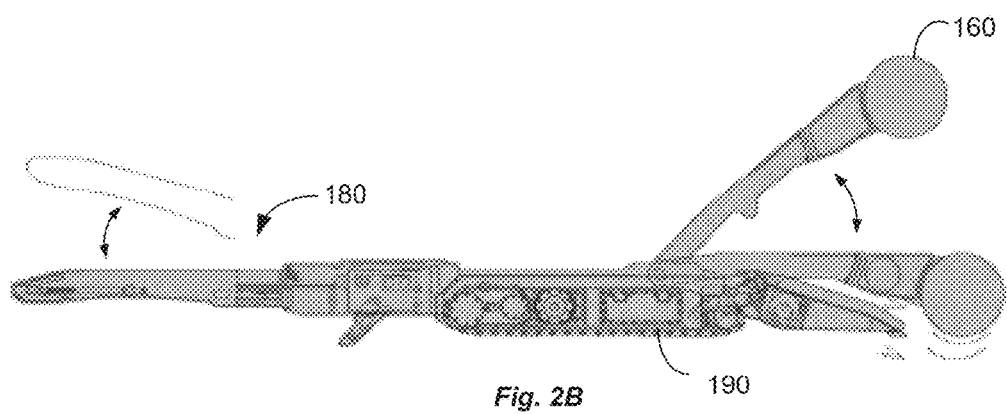
Figure 2C:
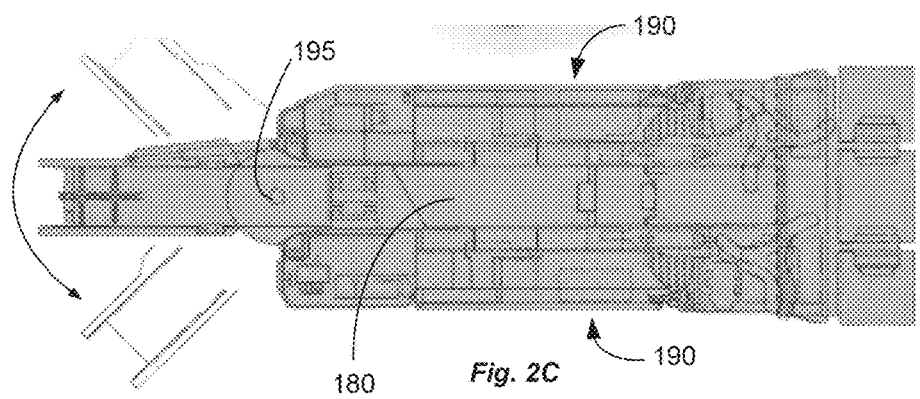

FIGS. 2A-C illustrate a continuous miner 150, which is an example of the mining machine 105 in the system 100. The continuous miner 150 includes a cutter system 155, which includes rotating cutters 160 with teeth 165 that, essentially, scrape ore (e.g., coal) from a ceiling in a mine shaft. The cutter system 155 is rotationally driven by a pair of motors via a gear box. That is, the gear box receives the rotational output of the motor pair and, in turn, drives the cutters 160. Falling ore is gathered in a collecting tray 170 and funneled by gathering heads 175 toward a conveyor 180. The gathering heads 175 are each rotated by a separate motor and the arms 185 push ore within the collecting tray 170 onto the conveyor 180. The continuous miner 150 further includes a set of left and right tracks 190 to provide movement of the entire machine. Each set of tracks is driven by a separate motor. As shown in FIG. 2B, the cutter system 155 and conveyor 180 may be raised and lowered, and, as shown in FIG. 2C, the conveyor 180 may be pivoted about a pivot point 195.

Figure 3:
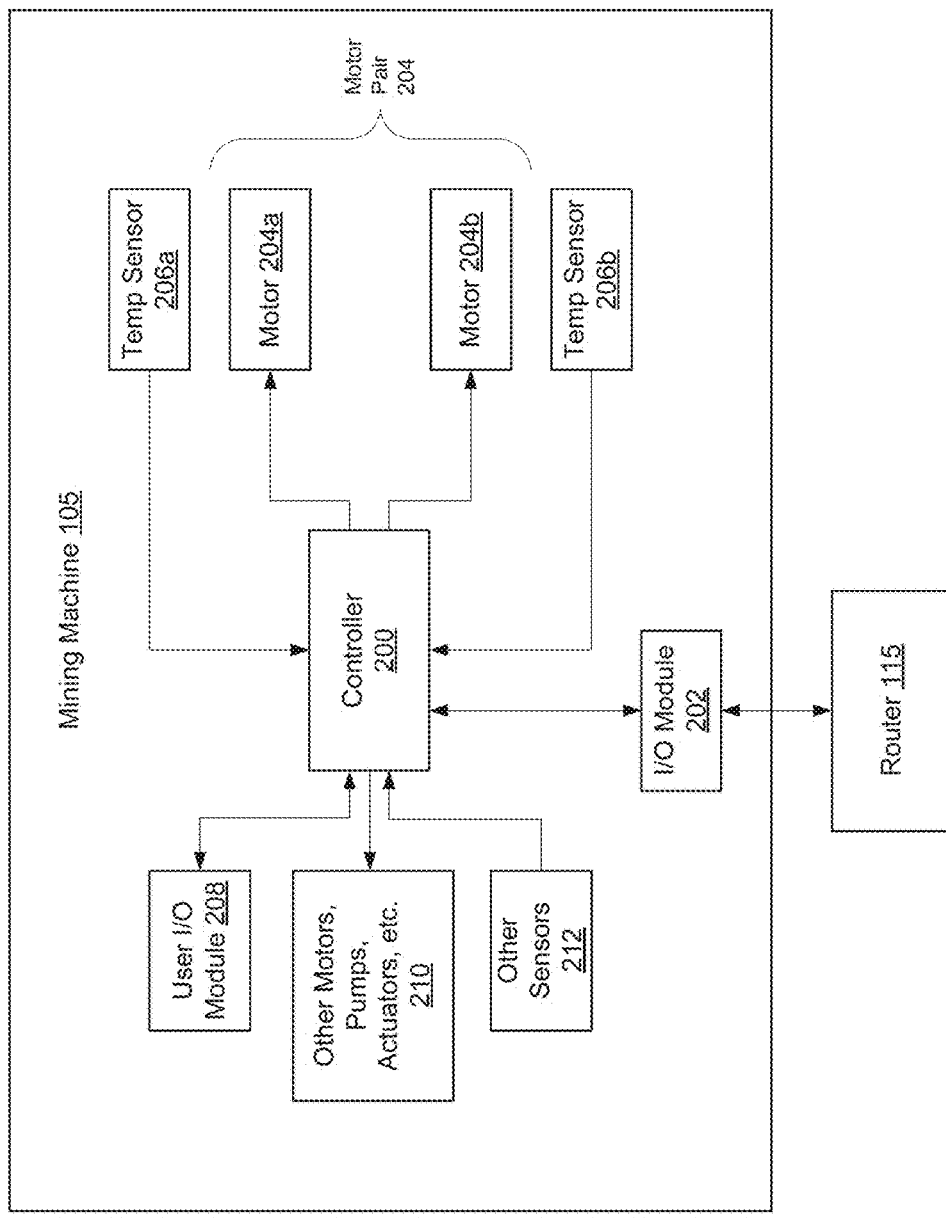
FIG. 3 illustrates a block diagram of a mining machine with motor pair monitoring.

FIG. 3 illustrates a block diagram of the mining machine 105. The mining machine 105 includes a controller 200 coupled to an input/output (I/O) module 202 for communicating with external devices, such as the router 115. The controller 200 is further coupled to a motor pair 204, temperature sensors 206, a user I/O module 208, other motors, pumps, actuators 210, and other sensors 212. The motor pair 204 includes a motor 204a and a motor 204b, with each driving similar components on the mining machine 105. For example, with reference to the continuous miner 150 of FIGS. 2A-C, the motors 204a and 204b each have a rotational output coupled to a single gear box (not shown) used to drive the cutter system 155. The gear box, driven by the motors 204a and 204b, in turn, drives the cutters 160 of the cutter system 155. Similarly, the motor 204a may drive one of the gathering heads 175 or one of the tracks 180, while the motor 204b drives the other of the gathering heads 175 or the other of the tracks 180. Generally, each motor of a particular motor pair is of the same type and has similar operating characteristics. Only a single motor pair 204 is illustrated in FIG. 3 to simplify the following explanation; however, the mining machine 105, like the continuous miner 150, may include multiple motor pairs and associated temperature sensors, and embodiments of the invention described herein may be applied to each pair.

The temperature sensors 206a and 206b detect a temperature of the motor 204a and 204b, respectively, and provides a signal to the controller 200 representative of the measured temperatures. The temperature sensors 206 may continuously provide temperature readings to the controller 200, or may provide temperature readings at discrete intervals. The temperature sensors 206a and 206b may be mounted on or near the motors 204a and 204b, respectively, to obtain the temperature data.

The user I/O module 208 provides a user interface and may include one or more of a display, graphical user interface, control buttons, levers, LEDs, speakers, etc. to enable the user to operate the mining machine 105. The other motors, pumps, actuators, etc. 210 represent the other controllable components of the mining machine 105. The other sensors 212 represent the additional sensors used to provide the controller 200 feedback on various components of and environmental characteristics near to the mining machine 105.

Figure 4:
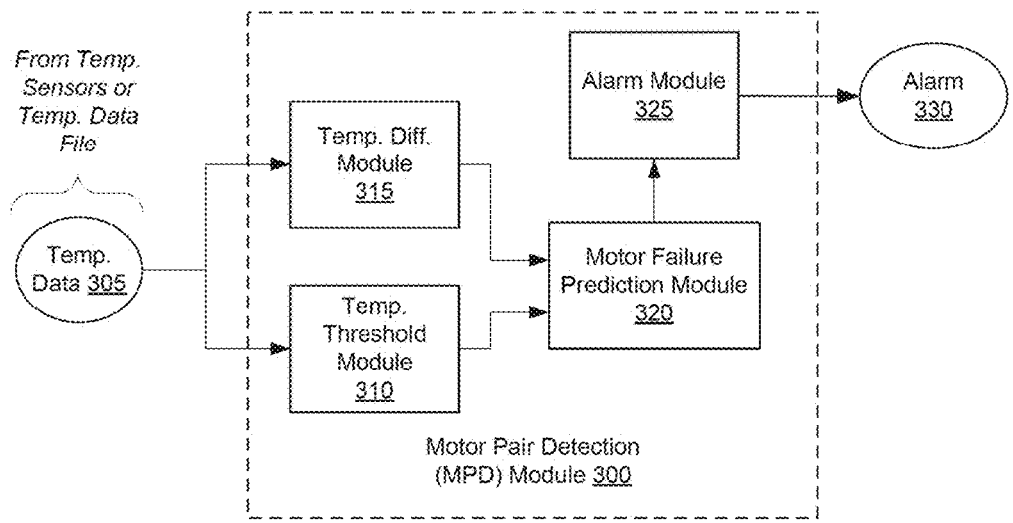
FIG. 4 illustrates a motor pair detection module.

FIG. 4 illustrates a motor pair detection (MPD) module 300. Based on the temperature data obtained by the temperature sensors 206, the MPD module 300 monitors the temperature of the motor pair 204 to predict an impending motor failure before significant damage occurs to one of the motors 204a,b or related components. As each motor 204a, b, in the motor pair 204 performs similar work functions, a variance in their relative temperatures may indicate a problem, a need for maintenance, and/or predict a future malfunction. Accordingly, the MPD module 300 detects particular variances in the relative temperatures of the motor pair 204, and generates an alarm such that a failure of one of the motors 204a,b can be avoided.

The MPD module 300 may be implemented on the mining machine 105, the remote server 140, the surface server 125, one of the remote clients 145, or the local client 130. In some instances, the MPD module 300 receives real-time temperature data from the temperature sensors 206, for example, when the MPD module 300 is implemented on the controller 200 of the mining machine 105. In some instances, the controller 200 aggregates sensor data collected from the temperature sensors 206 and the other sensors 212 and stores the aggregated sensor data in a memory of the mining machine 105. Periodically, the sensor data is output as a data file via the router 115 to one of more devices, such as the remote server 140, the surface server 125, the remote clients 145, and the local client 130. Generally, the data file includes the sensor data aggregated since the previous data file was sent. For example, a new data file with sensor data may be sent every fifteen minutes, the data file including sensor data aggregated over the previous fifteen minute window.

The temperature data 305, whether obtained from a data file of aggregated sensor data or in real time from the temperature sensors 206, is provided to a temperature threshold module 310 and a temperature difference module 315 of the MPD module 300. The temperature threshold module 310 and the temperature difference module 315 analyze the temperature data 305, and provide an output to the motor failure prediction module 320 based on their analysis.

The temperature threshold module 310 determines whether the temperature of either motor 204a or 204b exceeded a high temperature threshold, such as 300 degrees Fahrenheit, at least once during the time period that is being analyzed. If at least one of the motors 204a,b exceeded the high temperature, the temperature threshold module 310 outputs an indication of such (e.g., a TRUE signal) to the motor failure prediction module 320. The temperature difference module 315 determines whether, over the previous time period (e.g., fifteen minutes), the temperature of the motor 204a has varied from the temperature of the motor 204b by at least a particular amount (a "difference threshold") for at least a percentage threshold of the time period. If the temperatures of the motors 204a,b varied by at least the difference threshold (e.g., 45 degrees Fahrenheit) for at least a predetermined percentage (e.g., 95%) of the time period, the temperature difference module 315 outputs an indication of such (e.g., a TRUE signal) to the motor failure prediction module 320.

Figure 5:
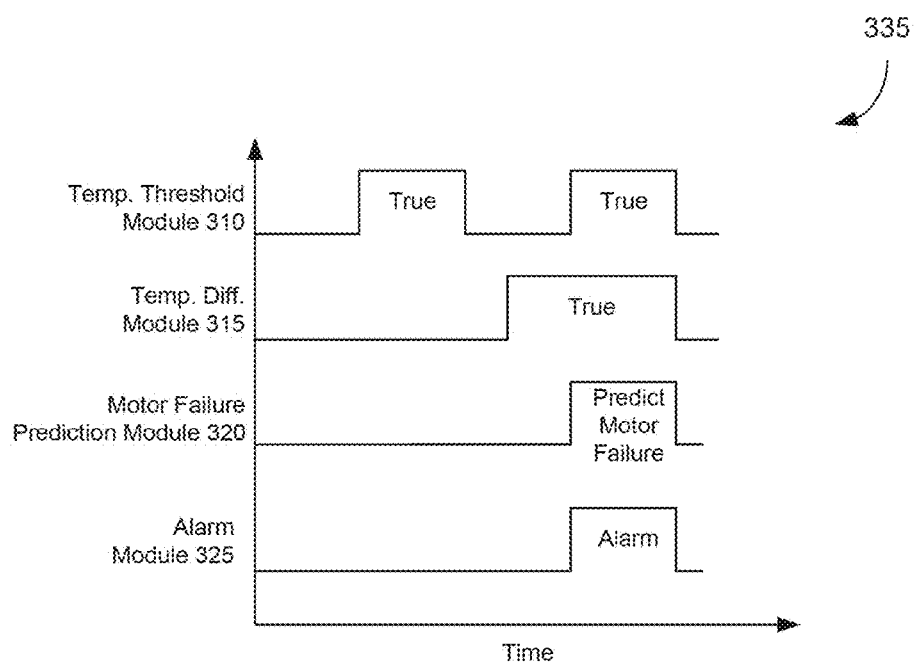
FIG. 5 illustrates a logic timing diagram for outputs of the motor pair detection module.

If the motor failure prediction module 320 receives a TRUE signal from both the temperature threshold module 310 and the temperature difference module 315, the motor failure prediction module 320 indicates to the alarm module 325 a prediction of a failure of one of the motors 204a,b. In response to receiving a prediction of motor failure, the alarm module 325 outputs an alarm 330. FIG. 5 depicts a logic timing diagram 335 illustrating the relationship between the outputs of the temperature threshold module 310, the temperature difference module 315, the motor failure prediction module 320, and the alarm module 325, as described above.

The motor failure prediction module 320 may also receive an indication from the temperature difference module 315 of which motor 204a or 204b had a higher temperature, as that motor would be associated with the failure prediction. The alarm signal 330 may be transmitted to one or more of the controller 200, the remote clients 145, the remote server 140, the local client 130, and the surface server 125 to alert a user, supervisor, and/or technician of a predicted motor failure. The alarm 330 may be transmitted via the various components and networks of the system 100 to arrive the appropriate destination device, or, if residing on the destination device (e.g., the mining machine 105), may be communicated directly from the MPD module 300. The receiving users, supervisors, and/or remote technicians may then take appropriate action to prevent a motor failure, such as preventative maintenance, upgrades, repairs, and the like. In some instances, in response to receiving the alarm 330, the controller 200 prevents or limits further operation of one or both of the motors 204a,b to prevent failure of the motor(s) 204a,b. In response to receive the alarm 330, the destination device may produce one or more of audible alerts (sirens, beeps, etc.), tactile alerts (vibrations), or visual alerts (flashing LEDs, text, etc.) to raise attention. The alarm 330 may also include alarm information, such as one or more of the temperature data that caused the alarm 330 to be generated, the identification of the mining machine 105, identification of the motor pair 204, location of the mining machine, type of alarm, and other information to inform the receiver of the alarm 330. For example, whether the MPT 300 resides on the mining machine 105 or the remote server 140, or elsewhere in the system 100, the alarm 330 may cause: LEDs to flash and text with the alarm information to be shown on a display of the mining machine 105; a smart phone 145b of a supervisor to display the alarm information; and/or a local client 130 to generate a pop-up screen on a graphical user interface to display the alarm information.

Figure 6A:
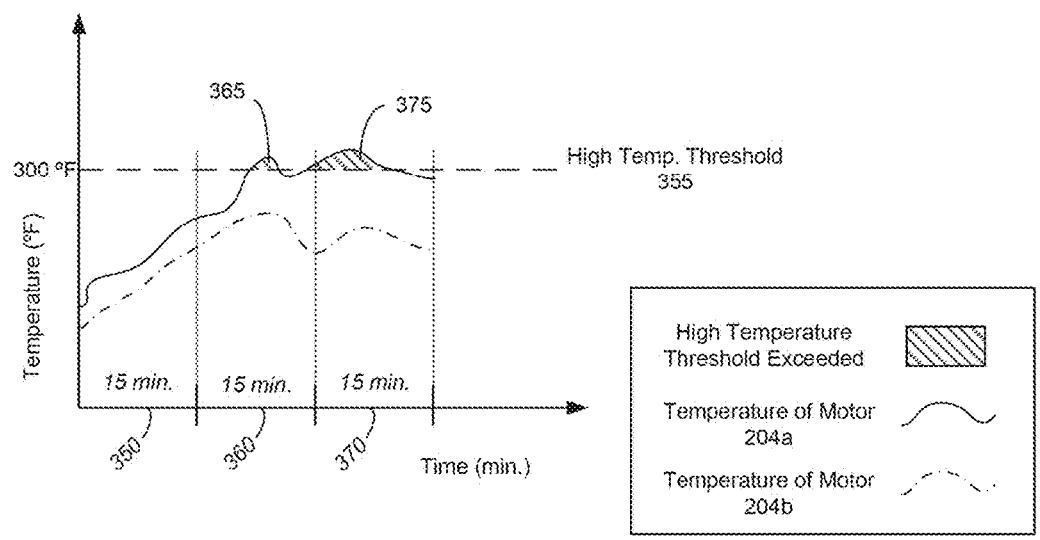
FIGS. 6A, 6B, and 7 illustrate temperature readings of a motor pair.
Figure 6B:
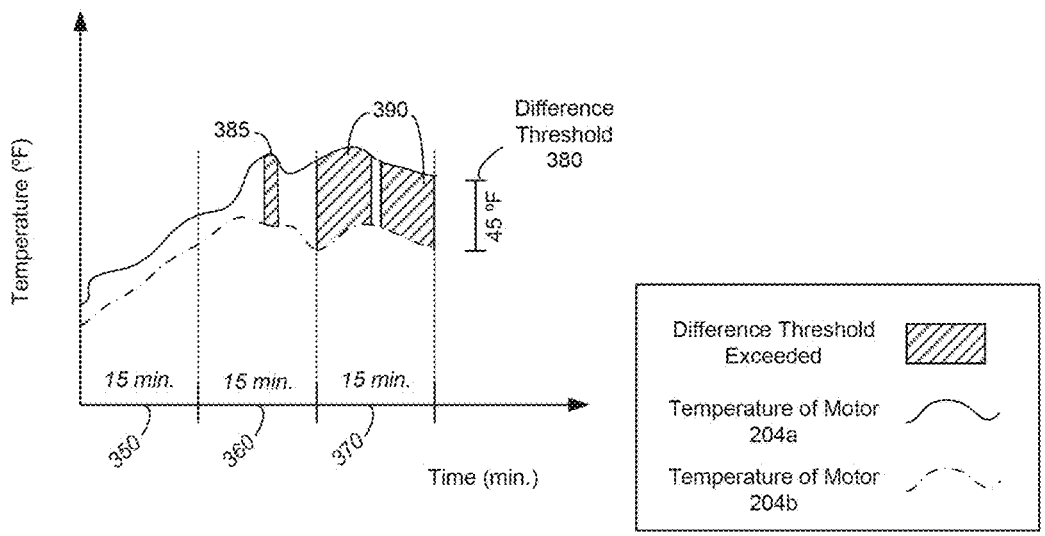

FIGS. 6A-B depict temperature data for the motor pair 204 obtained from three consecutive data files, each containing fifteen minutes of temperature data 305. FIG. 6A relates to the high temperature threshold analysis performed by the temperature threshold module 310. During a first time window 350, the temperatures of the motors 204a,b remain below a high temp threshold 355, which is assumed to be 300 degrees Fahrenheit in this example. During a second time window 360, the temperature of motor 204a exceeds the high temperature threshold 355 momentarily (see portion 365). In response to analyzing the temperature data 305 for time window 360, the temperature threshold module 310 outputs a TRUE signal. During a time window 370, the temperature of the motor 204a again exceeds the high temperature threshold 355 (see portion 375). In response to analyzing the temperature data 305 of the time window 370, the temperature threshold module 310 also outputs a TRUE signal.

FIG. 6B relates to the temperature difference analysis performed by the temperature difference module 315. FIG. 6B assumes a temperature difference threshold 380 is 45 degrees Fahrenheit and a percentage threshold of 95%. During the first time window 350, the temperature difference between the motor 204a and the motor 204b varies less than the difference threshold. Accordingly, the temperature difference module 315 does not output a TRUE signal for time window 350. During the time window 360, the temperature difference between the motor 204a and the motor 204b is less than the difference threshold for all but the portion 385. Since the ratio of the portion 385 to the time window 360 is less than the percentage threshold, the temperature difference module 315 does not output a TRUE signal. During the time window 370, the temperature difference between the motor 204a and the motor 204b is greater than the difference threshold for a large portion of the window (see portion 390). In other words, of the fifteen minutes of the time window 370, the difference threshold was exceeded for at least 14 minutes and 15 seconds (95% of 15 minutes). Since the ratio of the portion 390 to the time window 360 is greater than the percentage threshold, the temperature difference module 315 outputs a TRUE signal.

In summary, during the time window 370, at least one of the motors (motor 204a) exceeds 300 degrees Fahrenheit (the high temperature threshold 355), and the temperature of the motor pair 204 varies in excess of 45 degrees Fahrenheit (the difference threshold 380) for at least 95% (the percentage threshold) of the time window 375. Accordingly, the temperature threshold module 310 and the temperature difference module 315 output TRUE signals to the motor prediction module 320, and an alarm 330 is generated by the MPD module 300.

Figure 7:
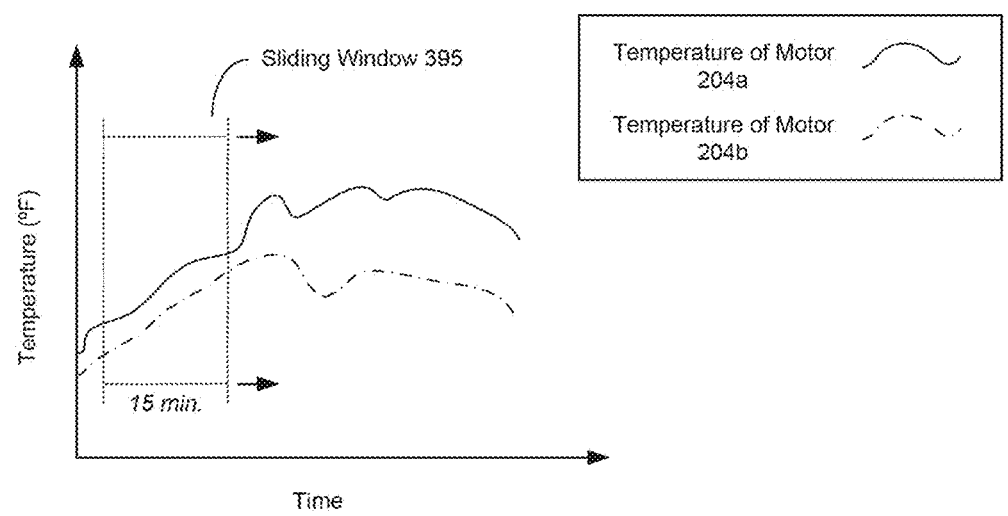

Although FIGS. 6A-B illustrate analysis of temperature data 305 provided in three data files, each covering fifteen minute windows of data, the MPD module 300 is also operable to analyze temperature data with a sliding window 395. For example, as illustrated in FIG. 7 and assuming a fifteen minute sliding window, every minute (or another increment), the MPD module 300 analyzes temperature data obtained for the previous fifteen minutes. Thus, at minute 15, the MPD module 300 analyzes temperature data for the time period from minute 0 to minute 15; at minute 16, the MPD module 300 analyzes temperature data from minute 1 to minute 16, and so forth.

The high temperature threshold 355, difference threshold 380, percentage threshold, and time window are variable depending on the particular motor pair 204 being monitored. In some instances, the high temperature threshold 355 is lower or higher than 300 degrees Fahrenheit, such as 200, 250, 275, 325, 350, and 400 degrees Fahrenheit or another temperature higher, lower, or in-between 200 and 400 degrees Fahrenheit. In some instances, the temperature difference threshold 380 is higher or lower than 45 degrees Fahrenheit, such as 25, 30, 35, 40, 50, 55, 60, or 65 degrees Fahrenheit, or another temperature higher, lower, or in-between 25 and 65 degrees Fahrenheit. In some instances, the percentage threshold is higher or lower than 95%, such as 50%, 75%, 85%, 90%, 99%, or 100%, or another value between 50% and 100%. In some instances, the time window may be greater or less than 15 minutes, such as 5, 10, 20, 25, or 30 minutes, or another time length higher, lower, or in-between 5 and 30 minutes. In some instances, the high temperature threshold 355, difference threshold 380, percentage threshold, and time window are variable on-the-fly based on environmental conditions, machine history, or other factors. For instance, the variables can be altered to be more sensitive (lower thresholds) or less sensitive (higher thresholds) as the machine ages or as the environmental conditions become more or less harsh.

Figure 8:
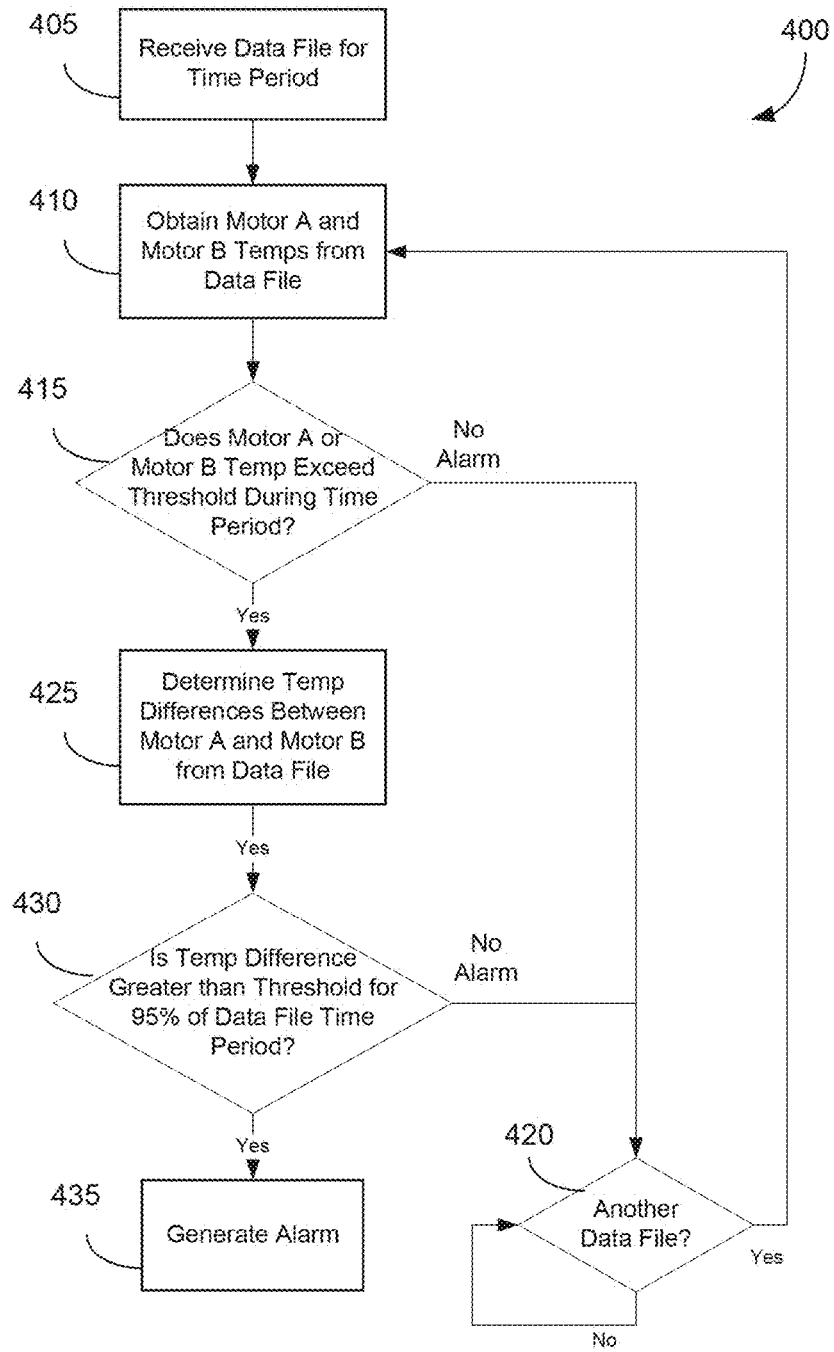
FIGS. 8-9 illustrate methods of predicting motor failure based on a relationship of motor pair characteristics.

FIG. 8 illustrates a method 400 for predicting motor failure based on temperature characteristics of the motor pair 204. The method 400 is described with reference to the MPD module 300 of FIG. 4. In step 405, the MPD module 300 obtains a data file containing aggregated temperature data obtained by the sensors 206 over a certain time window (e.g., fifteen minutes). In step 410, the temperature threshold module 310 and temperature difference module 315 obtain the temperature data 305 from the data file including the temperatures of the motor 204a and 204b collected during the time window. In step 415, the temperature threshold module 310 determines whether the temperature of either motor 204a or 204b ever exceeded a high temperature threshold 355, such as 300 degrees Fahrenheit, during the time window. The temperature threshold module 310 also indicates the result of the determination to the motor failure prediction module 320. If neither motor 204a nor motor 204b exceeded the high temperature threshold 355, the MPD module 300 does not predict a motor failure and proceeds to step 420 to await another data file.

If, however, one of the motors 204a or 204b exceeded the high temperature threshold 355, the MPD module 300 proceeds to step 425 to determine the temperature differences between the motor 204a and motor 204b during the time window. In step 430, the temperature difference module 315 determines whether the temperature difference between the motor 204a and the motor 204b is greater than the difference threshold 380 for a percentage of the time window greater than the percentage threshold. If true, the MPD module 300 generates an alarm in step 435. If false, the MPD module 300 proceeds to step 420 to await a further data file.

Although the steps of method 400 are depicted as occurring serially, one or more of the steps may be executed in parallel or partially in parallel. For instance, step 415 may occur in parallel with step 425 and/or step 430. Additionally, step 415 may occur after one or both of steps 425 and 430.

Figure 9:
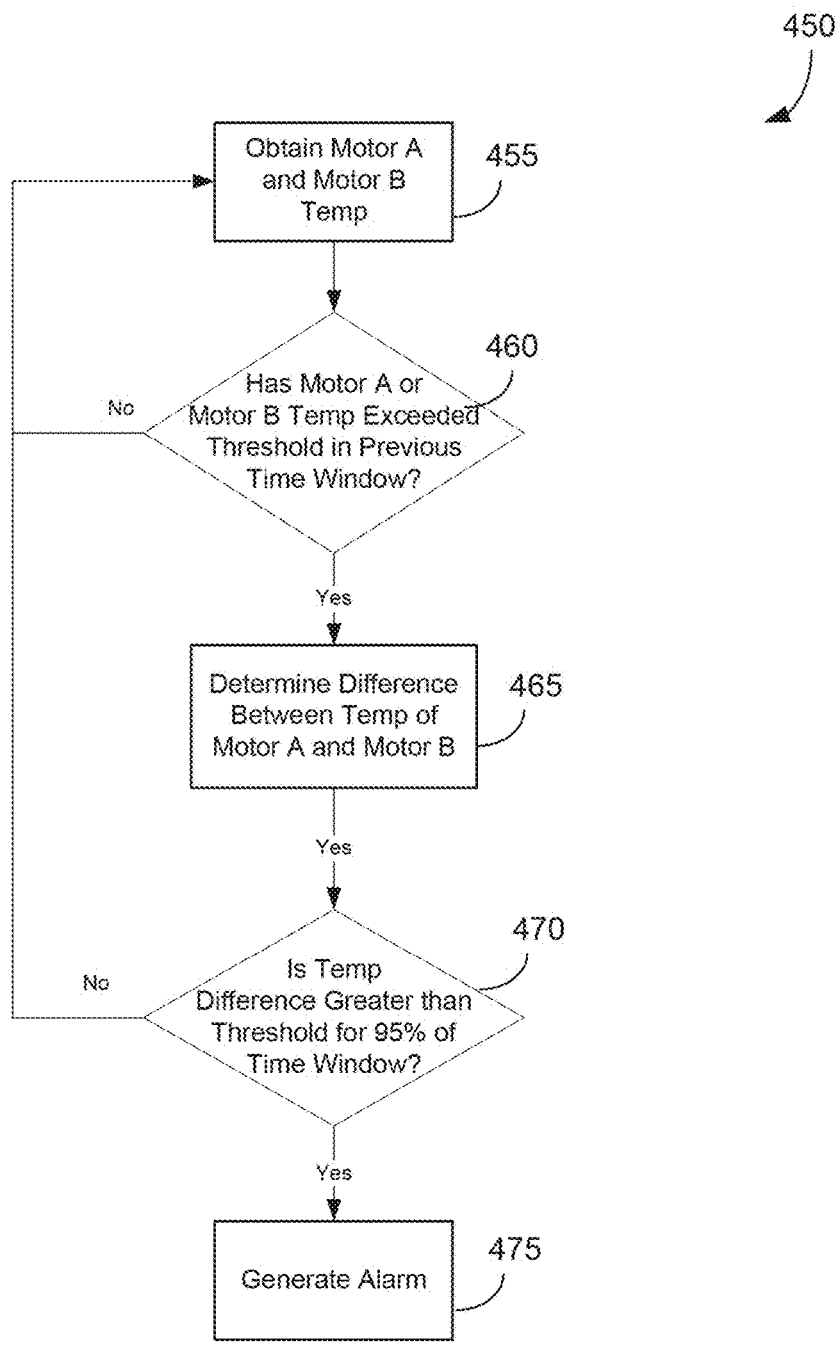

FIG. 9 illustrates a method 450 for predicting motor failure based on real-time temperature characteristics of the motor pair 204 using a sliding window such as sliding window 395. The method 450 may be used to monitor real-time temperature data from the temperature sensors 206, and the sliding window may be used to analyze temperature data obtained from data files. In step 455, the MPD module 300 obtains a temperature for motor 204a and for motor 204b. In step 460, the temperature threshold module 310 determines whether the temperature of the motor 204a or 204b has exceeded the high temperature threshold 355 in the previous time window (e.g., in the previous fifteen minutes). If not, the MPD module 300 returns to step 455 to obtain temperatures of the motor pair 204 at the next time interval. The next time interval may be, for example, a matter of seconds, one minute, or several minutes. If one of the motors 204a,b exceeded the high temperature threshold 355, the MPD module 300 proceeds to step 465. In step 465, the temperature difference module 315 determines the temperature differences between the motor 204a and motor 204b during the previous time window. In step 470, the temperature difference module 315 determines whether the temperature difference between the motor 204a and the motor 204b is greater than the difference threshold 380 for a percentage of the previous time window greater than the percentage threshold. If true, the MPD module 300 generates an alarm in step 475. If false, the MPD module 300 returns to step 455 to obtain temperatures of the motor pair 204 at the next time interval.

Although the steps of method 450 are depicted as occurring serially, one or more of the steps may be executed in parallel or partially in parallel. For instance, step 460 may occur in parallel with step 465 and/or step 470. Additionally, step 460 may occur after one or both of steps 465 and 470.

The MPD module 300 may be used with or may implement further temperature related motor failure prediction or detection schemes. For example, if the temperature of one of the motors 204a,b reaches a very high threshold, at any given point, the MPD module 300 may generate an alarm regardless of the temperature of the other motor 204a,b and the time length at which the very high threshold was exceeded. Thus, the MPD module 300 is operable to supplement additional motor and mining machine monitoring techniques not described herein.

In some embodiments, the motor pair 204 is cooled by a cooling system, such as a water cooling circuit. The cooling system may be a parallel cooling system that cools both motors 204*a,b* in parallel, or a series cooling system that cools the motors 204*a,b* in series. In a parallel cooling system, the motors 204*a,b* generally have a similar temperature during normal operation. In a series cooling system, one of the motors 204*a,b* is generally has a higher temperature than the other of the motors 204*a,b* during normal operation. The discrepancy occurs, for instance, because the cooling system cools the motor 204*a* first, and the residual cooling agent is then applied to the motor 204*b*.

For a mining machine 105 with a parallel cooling system, a single difference threshold (e.g., 45 degrees Fahrenheit) may be used, as described in the above examples. However, for a mining machine 105 with a series cooling system, the difference threshold may vary depending on which motor 204*a,b* has a higher temperature than the other motor 204*a,b*. In an exemplary embodiment, the mining machine 105 uses a series cooling system in which the motor 204*a* generally operates about 10 degrees Fahrenheit warmer than the motor 204*b*. In this embodiment, taking the normal operating temperature difference into account, the difference threshold is exceeded when either (1) the motor 204*a* is 55 degrees Fahrenheit warmer than the motor 204*b* or (2) the motor 204*b* is 25 degrees Fahrenheit warmer than the motor 204*a*. Accordingly, in a mining machine 105 with a series cooling system, the method 400 and 450 may be implemented such that steps 430 and 470 include a sub-steps of determining which motor 204*a,b* has a higher temperature, and then selecting and using the appropriate difference threshold based on the determination. The particular temperature thresholds are merely exemplary, as other values may be used in embodiments of the invention.

In some embodiments, in place of temperature sensors 206, another sensor or technique is used to infer the temperatures of the motor pair 204. For example, by monitoring the current drawn by the motor 204*a* with a current sensor, the controller 200 may infer the temperature of the motor 204*a*. The controller 200 converts the current to temperature data 305 and provides it to the MPD module 300. In other embodiments, motor power consumption, motor power factor, or other motor parameters can be used to detector or predict possible motor failure.

Furthermore, in some embodiments, the mining machine 105 may be a mining machine other than the continuous miner (see FIGS. 2A-C) that has at least one motor pair including above-surface mining machines. For example, the mining machine 105 may be a shuttle car having one or more traction motor pairs, a flexible conveyor train having one or more traction motor pairs, and a battery-powered haulage vehicle (also referred to as a battery hauler) having one or more traction motor pairs.

Moreover, in some embodiments, the motor pair failure prediction techniques described herein may be implemented on other machines and vehicles having one or more motor pairs, such as electric passenger vehicles, industrial equipment, watercraft, and the like.

Thus, the invention provides, among other things, systems and methods for predicting failure of a motor in a mining machine motor pair. Various features and advantages of the invention are set forth in the following claims.

What is claimed is:

1. A method of predicting motor failure, the method comprising:
   receiving, by a controller, a parameter of a first motor on a mining machine from a first parameter sensor on a mining machine;
   receiving, by the controller, a parameter of a second motor on the mining machine from a second parameter sensor on the mining machine; and
   outputting an alarm signal, by the controller, upon
      determining that at least one selected from the group consisting of the parameter of the first motor and the parameter of the second motor exceeds a parameter threshold, and
      determining that the parameter of the first motor differed from the parameter of the second motor by at least a difference threshold for a predetermined amount of time.

2. The method of claim 1, wherein the alarm signal is received by at least one selected from the group consisting of the mining machine and a remote device and, in response, the at least one of the mining machine and the remote device produces at least one of an audible, visual, or tactile indication of receiving the alarm signal.

3. The method of claim 1, wherein
   the step of receiving, by the controller, of the parameter of the first motor on the mining machine includes receiving a data file of aggregated parameter data for the first motor, and
   the step of receiving, by the controller, of the parameter of the second motor on the mining machine includes receiving the data file of aggregated parameter data for the second motor.

4. The method of claim 1, wherein
   the parameters of the first and second motors are temperatures; and
   the parameter threshold is a temperature threshold.

5. The method of claim 1, further comprising:
   determining, by the controller, which of the parameter of the first motor and the parameter of the second motor is larger; and
   selecting, by the controller, the difference threshold based on which of the parameter of the first motor and the parameter of the second motor is larger.

6. The method of claim 5, the method further comprising selecting a first threshold value to be the difference threshold when the parameter of the first motor is larger than the parameter of the second motor and a second threshold value when the parameter of the second motor is larger than the parameter of the first motor,
   wherein the first threshold value is smaller than the second threshold value, and
   wherein the first motor and the second motor are part of a series cooling system, the first motor receiving a cooling agent before the second motor in the series cooling system.

7. A mining machine monitoring system, the system comprising:
   a motor pair of a machine including a first motor and a second motor;
   a first parameter sensor that detects a first parameter of the first motor;
   a second parameter sensor that detects a second parameter of the second motor; and
   a controller coupled to the first and second parameter sensors to obtain the first and second parameters, the controller outputting an alarm signal upon
      determining that at least one selected from the group of the first parameter and the second parameter exceeds a parameter threshold, and determining that the first parameter of the first motor differed from the second parameter of the second motor by at least a difference threshold for a predetermined amount of time.

8. The mining machine monitoring system of claim 7, wherein the controller is located remote from the machine and communicates with the machine via a network.

9. The mining machine monitoring system of claim 7, wherein the alarm signal is received by at least one selected from the group consisting of the machine and a remote device and, in response, the at least one of the machine and the remote device produces at least one of an audible, visual, or tactile indication of receiving the alarm signal.

10. The mining machine monitoring system of claim 7, wherein
the first and second parameter sensors are temperature sensors;
the first and second parameters of the first and second motors are temperatures; and
the parameter threshold is a temperature threshold.

11. The mining machine monitoring system of claim 7, wherein the controller is configured to determine which of the first parameter of the first motor and the second parameter of the second motor is larger, and wherein the difference threshold is selected based on which of the first parameter of the first motor and the second parameter of the second motor is larger.

12. The mining machine monitoring system of claim 11, further comprising:
a series cooling system configured to cool the first motor and the second motor, the first motor receiving a cooling agent before the second motor in the series cooling system,
wherein the difference threshold is selected to be a first threshold value when the first parameter is larger than the second parameter and is selected to be a second threshold value when the second parameter is larger than the first parameter, and
wherein the first threshold value is smaller than the second threshold value.

13. A method of predicting motor failure, the method comprising:
receiving, by a controller, a first parameter of a first motor on a mining machine from a first parameter sensor on a mining machine;
receiving, by the controller, a second parameter of a second motor on the mining machine from a second parameter sensor on the mining machine, wherein the second motor is downstream from the first motor in a series cooling system;
outputting a first alarm signal, by the controller, upon determining that the first parameter of the first motor is greater than the second parameter of the second motor by at least a first difference threshold; and
outputting a second alarm signal, by the controller, upon determining that the second parameter of the second motor is greater than the first parameter of the first motor by at least a second difference threshold, wherein the second difference threshold is greater than the first difference threshold.

14. The method of claim 13, further comprising:
determining, by the controller, which of the first parameter and the second parameter is larger; and
selecting, by the controller, between the first difference threshold and the second difference threshold based on the determination of which of the first parameter and the second parameter is larger.

15. The method of claim 13, wherein the first alarm signal is received by at least one selected from the group consisting of the mining machine and a remote device and, in response, the at least one of the mining machine and the remote device produces at least one of an audible, visual, or tactile indication of receiving the first alarm signal.

16. The method of claim 13, wherein
the first and second parameters are temperatures; and
the first and second difference thresholds are temperature thresholds.

17. The method of claim 13,
wherein outputting the first alarm signal is dependent on determining that the first parameter is greater than a parameter threshold, and
wherein outputting the second alarm signal is dependent on determining that the second parameter is greater than the parameter threshold.

18. A mining machine monitoring system, the system comprising:
a series cooling system on a mining machine;
a motor pair of the mining machine including a first motor and a second motor, wherein the second motor is downstream from the first motor in the series cooling system;
a first parameter sensor that detects a first parameter of the first motor;
a second parameter sensor that detects a second parameter of the second motor;
a controller coupled to the first and second parameter sensors to obtain the first and second parameters, the controller configured to
receive the first parameter detected by the first parameter sensor,
receive the second parameter detected by the second parameter sensor,
output a first alarm signal upon determining that the first parameter of the first motor is greater than the second parameter of the second motor by at least a first difference threshold, and
output a second alarm signal upon determining that the second parameter of the second motor is greater than the first parameter of the first motor by at least a second difference threshold, wherein the second difference threshold is greater than the first different threshold.

19. The mining machine monitoring system of claim 18, wherein the controller is further configured to
select between the first difference threshold and the second difference threshold based on determining which of the first parameter and the second parameter is larger.

20. The mining machine monitoring system of claim 18, wherein the controller is located remote from the machine and communicates with the machine via a network.

21. The mining machine monitoring system of claim 18, wherein
the first and second parameter sensors are temperature sensors;
the first and second parameters are temperatures; and
the first and second difference thresholds are temperature thresholds.

22. The method of claim 18, wherein the controller is further configured to
output the first alarm signal dependent on determining that the first parameter is greater than a parameter threshold, and output the second alarm signal dependent on determining that the second parameter is greater than the parameter threshold.

* * * * *